United States Patent
Aweya et al.

(10) Patent No.: US 8,880,105 B2
(45) Date of Patent: Nov. 4, 2014

(54) METHOD AND SYSTEM FOR LOCALIZATION

(75) Inventors: James Aweya, Abu Dhabi (AE); Nayef Alsindi, Abu Dhabi (AE); Kin Poon, Abu Dhabi (AE)

(73) Assignees: Khalifa University of Science, Technology and Research, Abu Dhabi (AE); British Telecommunications plc, London (GB); Emirates Telecommunications Corporation, Abu Dhabi (AE)

( * ) Notice: Subject to any disclaimer, the term of this patent is extended or adjusted under 35 U.S.C. 154(b) by 42 days.

(21) Appl. No.: 13/339,777

(22) Filed: Dec. 29, 2011

(65) Prior Publication Data

US 2013/0172020 A1 Jul. 4, 2013

(51) Int. Cl.
*H04W 24/00* (2009.01)

(52) U.S. Cl.
USPC .......................................................... 455/457

(58) Field of Classification Search
CPC ....... G01S 5/0252; H04W 24/00; H04W 4/04
USPC ................ 455/457, 456.1, 404.2, 440, 456.2, 455/456.3, 456.4, 456.5, 456.6
See application file for complete search history.

(56) References Cited

U.S. PATENT DOCUMENTS

| | | | |
|---|---|---|---|
| 7,072,671 B2 * | 7/2006 | Leitch .......................... | 455/456.1 |
| 7,630,943 B2 | 12/2009 | Nerguizian et al. | |
| 2005/0096068 A1 * | 5/2005 | Bahl et al. ................... | 455/456.1 |
| 2008/0144512 A1 * | 6/2008 | Molisch et al. ............... | 370/238 |
| 2009/0112517 A1 * | 4/2009 | Hsyu et al. ..................... | 702/181 |
| 2010/0311436 A1 | 12/2010 | Bevan et al. | |
| 2012/0143495 A1 * | 6/2012 | Dantu ........................... | 701/428 |

OTHER PUBLICATIONS

K. Pahlavan, X. Li and J.P. Makela, "Indoor geolocation science and technology", IEEE Communications Magazine, vol. 40, issue 2, pp. 112-118, Feb. 2002.
K. Pahlavan, F.O. Akgul, M. Heidari, A. Hatami, J. M. Elwell, R. D. Tingley, "Indoor geolocation in the absence of direct path", IEEE Wireless Communications, vol. 13, No. 6, pp. 50-58, Dec. 2006.
P. Bahl and V. Padmanabhan, "RADAR: an in-building RF-based user location and tracking system," in Proc. IEEE INFOCOM, vol. 2, pp. 775-784, Mar. 2000.

(Continued)

*Primary Examiner* — Shahriar Behnamian
(74) *Attorney, Agent, or Firm* — Calfee, Halter & Griswold LLP

(57) ABSTRACT

This invention relates to methods and devices for entropy-based location fingerprinting, in particular for use over wireless local-area networks (WLANs). The invention has particular application in localization for indoor environments. In embodiments of the invention, an entropy-based fingerprint is determined at a number of predetermined locations within the desired area of localization during an off-line phase and subsequently used in an on-line mode to determine the location of a receiver. In particular embodiments, the fingerprint is a vector of entropy estimates of the channel transfer function (CTF) between a mobile terminal and all access points within coverage. The invention seeks to provide a fingerprinting localization solution that has a simplicity of structure, leading to advantages in storage and pattern recognition requirements, and robustness by proving a unique measure of information that is related to the channel experienced at the location of the mobile terminal.

21 Claims, 5 Drawing Sheets

(56) References Cited

OTHER PUBLICATIONS

C. Nerguizian, C. Despins and S. Affes, "Geolocation in mines with an impulse response fingerprinting technique and neural networks," IEEE Trans. Wireless Commun., vol. 5, pp. 603-611, Mar. 2006.

H. Koshima and J. Hoshen, "Personal Locator Services Emerge," in IEEE Spectrum, vol. 37, issue 2, pp. 41-48, Feb. 2000.

S. Ahonen and P. Eskelinen, "Mobile Terminal location for UMTS," in IEEE Aerospace and Electronic Systems Magazine, vol. 18, issue 2, pp. 23-27, Feb. 2003.

S. Ahonen and P. Eskelinen, "Performance Estimations of Mobile terminal location with database correlation in UMTS networks," in Proc. of Int'l Conf. on 3G Mobile Communication Technologies, pp. 25-27, Jun. 2003.

M. Triki, D. T.M. Slock, V. Rigal and P. Francois, "Mobile terminal positioning via power delay profile fingerprinting: reproducible validation simulations", IEEE 64th Vehicular Technology Conference, pp. 1-5, Sep. 2006.

Y. Jin, W.-S. Soh, W.-C. Wong, "Indoor localization with channel impulse response based fingerprint and nonparametric regression", IEEE Transactions on Wireless Communications, vol. 9, No. 3, pp. 1120-1127, Mar. 2010.

W.Q. Malik, B. Allen, "Wireless sensor positioning with UWB fingerprinting", 1st European Conference on Antennas and Propagatoin EuCAP, pp. 1-5, Nov. 2006.

H. Liu, H. Darabi, P. Banerjee and J. Liu, "Survey of wireless indoor positioning techniques and systems", IEEE Transactions on Systems, Man and Cybernetics—Part C: Applications and Review, vol. 37, No. 6, Nov. 2007.

M. Brunato and R. Battiti, "Statistical learning theory for location fingerprinting in wireless LANs," Computer Networks, vol. 47, No. 6, pp. 825-845, Apr. 2005.

T. Roos, P. Myllymaki, H. Tirri, P. Misikangas and J. Sievanen, "A probabilistic approach to WLAN user location estimation," International Journal of Wireless Information Networks (IJWIN), vol. 9, pp. 155-164, Jul. 2002.

A. Kushki, K. N. Plataniotis and A. N. Venetsanopoulos, "Kernel-based positioning in wireless local area networks," IEEE Mobile Computing, vol. 6, No. 6 pp. 689-705, Jun. 2007.

D. Fox, J. J Hightower, L. Liao, D. Schulz, "Bayesian filtering for location estimation," IEEE Pervasive Computing, vol. 2, No. 3 pp. 24-33, 2003.

D. Madigan, E. Einahrawy, R. Martin, W.-H. Ju, P. Krishnan and A. Krishnakumar, "Bayesian indoor positioning systems," in Proc. INFOCOM, vol. 2, pp. 1217-1227, 2005.

M. A. Youssef, A. Agrawala, and A. U. Shankar, "WLAN location determination via clustering and probability distribution," in Proc. IEEE International Conf. on Pervasive Computing and Communications, pp. 143-150, 2003.

A. Agiwal, P. Khandpur, H. Saran, "LOCATOR: location estimation system for wireless LANs," in Proc. of 2nd ACM Int't workshop on Wireless Mobile Applications and Services on WLAN Hotspots, pp. 102-109, 2004.

M. Youssef and A. Agrawala, "The Horus WLAN location determination system," in Proc of 3rd International Conference on Mobile Systems, Applications and Services, pp. 205-218, 2005.

R. Battiti, T. L. Nihat, and A. Villani, "Location-aware computing: a neural network model for determining location in wireless LANs," Technical Report DIT-020083, Dept. of Info. And Comm. Technology, University of Trento, Italy, 2002.

E.A. Martinez, R. Cruz and J. Favela, "Estimating user location in a WLAN using back propagation neural networks," Lecture Notes in Computer Science, vol. 3315, pp. 737-746, 2004.

Z. Li Wu, C. hung Li, J.-Y. Ng and K. R. Leung, "Location estimation via support vector regression," IEEE Trans. Mobile Computing, vol. 6, No. 3, pp. 311-321, 2007.

C. L. Wu, L. C. Fu and F. L. Lian, "WLAN location determination in e-home via support vector classification", in Proc. IEEE Int'l Conference on Networking, Sensing and Control, pp. 1026-1031, 2004.

S.-H. Fang, T.-N. Lin, K.-C Lee, "A novel algorithm for multipath fingerprinting in indoor WLAN environments", IEEE Transactions on Wireless Communications, vol. 7, No. 9, Sep. 2008.

T.-N. Lin, P.-C Lin, "Performance comparison of indoor positioning techniques based on location fingerprinting in wireless networks," in Wireless Networks, Communications and Mobile Computing, pp. 1569-1574, 2005.

V. Honkavirta, T. Perala, S. A.-Loytty and R. Piche, "A comparative survey of WLAN location fingerprinting methods," Proc. of the 6th Workshop on Positioning, Navigation and Communication (WPNC'09), pp. 243-251, Mar. 2009.

V. Honkavirta, "Location Fingerprinting Methods in Wireless Local Area Networks," MS Thesis, Tampere University of Technology, Finland, Oct. 2008.

F. Evennou and F. Marx, "Advanced integration of WiFi and inertial navigation systems for indoor mobile positioning", EURASIP Journal on Applied Signal Processing, vol. 2006, Article ID 86706, pp. 1-11, Jan. 2006.

C. E. Shannon, "A mathematical theory of communication," Bell Syst. Tech. J., vol. 27, pp. 379-423; 623-656, Jul./Oct. 1948 [Online] Available http://cm.bell-labs.com/cm/ms/what/shannonday/paper.html.

J.-F. Bercher, C. Vigant, "Estimating the entropy of a signal with applications", IEEE Trans. on Signal Processing, vol. 48, No. 6, pp. 1687-1694, Jun. 2000.

R. Moddemeijer, "On estimation of entropy and mutual information of continuous distributions," Signal Processing, vol. 16, No. 3, pp. 233-246, 1989.

P. Hall and S. Morton, "On the estimation of entropy," Ann. Inst. Stat. Math., vol. 45, pp. 69-88, 1993.

O. Vasicek, "A test of normality based on sample entropy," J. R. Stat. Soc. Ser. B, vol. 38, pp. 54-59, 1976.

J. C. Correa, "A new estimator of entropy," Commun. Stat.-Theory Methodol., vol. 24, pp. 2439-2449, 1995.

P. Viola, N. N. Schraudolph and T. J. Sejnowski, "Empirical entropy manipulation for real-world problems," in Advances in Neural Information Processing Systems 8. Cambridge, MA: MIT Press, 1996.

D.T. Pham, "Blind separation of instantaneous mixture of sources via an independent component analysis," IEEE Trans. Signal Processing, vol. 44, pp. 2768-2779, Nov. 1996.

S. Kay, "Model-based probability density function estimation," IEEE Signal Processing Letters, vol. 5, No. 12, Dec. 1998.

M. H. Hayes, Statistical Digital Signal Processing and Modeling, John Wiley & Sons, Inc., 1996.

G. Kitagawa and W. Gersh, "A smoothness priors long AR model method for spectral estimation," IEEE Trans. Automat. Contrl., vol. AC-30, pp. 57-65, 1985.

J.-F. Giovannelli, G. Demoment and A. Herment, "A Bayesian method for long AR spectra estimation: A Comparative study," IEEE Trans. Ultrason. Freq. Ferroelect., vol. 43, pp. 220-233, Mar. 1996.

B. Yang, K.B. Letaief, R. S. Cheng and Z. Cao, "Channel estimation for OFDM transmission in multipath fading channels based on parametric channel modeling," IEEE Trans. on Commun., vol. 49, No. 3, Mar. 2001.

K. Kaemarungsi and P. Krishnamurthy, "Modeling of indoor positioning systems based on location fingerprinting," Proc. INFOCOM, vol. 2, pp. 1012-1022, 2004.

\* cited by examiner

METHOD AND SYSTEM FOR LOCALIZATION

FIELD OF THE INVENTION

The present invention relates to a method and system for localization. It is particularly, but not exclusively, concerned with a method and system for indoor localization of wireless devices that makes use of an entropy function to achieve precise localization.

BACKGROUND OF THE INVENTION

Indoor localization has gained considerable attention over the last decade due to the enormous potential in the technology and the significant challenges facing this area of research [1].

Localization in traditional line of sight (LOS) environments such as outdoors has been a success as exemplified by the popular Global Positioning System (GPS). Extending GPS's success to indoor environments, however, faces considerable fundamental challenges. The most notable of those are the non-LOS (NLOS) environment and severe multipath propagation phenomena [1, 2].

Typically there are two main philosophies to localize nodes/mobile terminals in an indoor environment.

The first is localization based on extracting the ranging metrics from existing/deployed infrastructure (Time of Arrival (TOA), Received Signal Strength (RSS), Angle of Arrival (AOA) or any combination of them) and performing well known tri-lateration techniques. This technique is highly affected by the system bandwidth and the propagation environment (NLOS) and it is usually performed in real-time without any prior set up or training.

The second approach is based on location fingerprinting. The basic idea of location fingerprinting is to create a database of "fingerprints" constructed from measured channel parameters that are extracted from available wireless network infrastructures such as access points (APs) in an offline phase across a given indoor environment. This fingerprinting database is typically formed by creating a grid of points (e.g. in 1 m squares) across an area or floor of an indoor environment and in each grid location a fingerprint is constructed from measurements received from all available APs. Location estimates are then obtained in the online phase by comparing the measured fingerprint parameters to the fingerprinting database by using pattern matching algorithms. The signature/fingerprint closest to the measured one corresponds to the estimated location.

FIG. 1 illustrates the difference between the two localization approaches in schematic form. FIG. 1a shows ranging and tri-lateration based on RSS, TOA, AOA or any combination of those techniques. FIG. 1b shows fingerprinting (e.g. using RSS or CIR). The red dots are measured locations in offline stage. Measurements in online stage are compared using pattern matching algorithms to the database and the center of grid with closest match is taken as the estimated position.

Existing location fingerprinting techniques are typically categorized based on the type of collected signal parameter(s). The 3 major channel/signal parameters that have been used for the fingerprints are: Received Signal Strength (RSS); time-domain Channel Impulse Response (CIR); frequency-domain Channel Transfer Function (CTF) and Frequency Channel Coherence Function (FCF). One of the earliest and simplest fingerprinting techniques is RSS-based fingerprinting. The simplicity stems from the fact that RSS measurement values are readily available in IEEE 802.11 standards implementation [3]. As a result a fingerprint vector can be easily constructed from RSS measurements received from the available APs.

A more robust fingerprinting mechanism is based on the CIR. Typically, the CIR provides a more unique but complex metric that can be used as a fingerprint, since it is a representation of the multipath channel in the time-domain [4, 5]. The uniqueness stems from the fact that the amplitude and delay of the multipath arrivals at each location are different because of the complex interaction of the RF signal and the indoor environment (reflections and diffractions of signals from walls, objects, etc.). Thus CIR-based fingerprinting techniques thrive on the multipath environment where the channel impulse response at each location is a unique signature. Since the multipath structure is unique and varies from one location to the next, it is possible to identify a location by a single AP. The CIR-fingerprinting technique that relies on the multipath structure to uniquely identify a given location was first introduced by US Wireless Corp. of San Ramon, Calif. [7].

Fingerprinting using the channel impulse response (multipath structure) was also proposed for cellular UMTS localization [8, 9]. The CIR-based fingerprinting algorithm was also successfully implemented in a neural network pattern recognition system which achieved good localization accuracy inside a mine [4, 5].

CIR-based fingerprinting can be further improved by implementing an antenna array approach where the spatial characteristics of the channel are captured resulting in a new metric defined by Power Spatial Delay Profile (PSDP). The CIR contains the magnitude of the delay components which removes all the phase information and as a result this technique cannot exploit the additional spatial information [10].

An improvement to CIR-based fingerprinting has been proposed [11] where a non-parametric regression technique (Nadaraya Watson Kernel estimator) is used as the location estimator. In addition the authors of the above document introduce regional smoothing and logarithmic scale transformation to further improve performance.

CIR fingerprinting-based localization has been further investigated for UWB signals in [12] where the effect of system bandwidth on the probability of false alarm and robustness of estimation is investigated through channel measurements in an indoor environment. In general increasing the system bandwidth improves accuracy and reliability significantly [12].

Analogous to the time domain impulse response, the CTF can also be used for fingerprinting. The CTF contains the multipath channel information in the form of complex samples in the frequency domain. The authors in [12] have further proposed the CTF correlation fingerprint which is more stable and has superior performance. A patent application proposes a similar technique that integrates FCF-based (autocorrelation of CTF) fingerprinting in existing OFDM-based systems (such as WLANs) [6].

An RSS-based fingerprint is a vector of dimension M, where M is the number of available APs. The CIR-, CTF- or FCF-based fingerprints are matrices with dimension M by N, where N is the number of samples in the CIR, CTF or FCF vector. The disadvantage of RSS-based fingerprinting is that the fingerprint structure lacks uniqueness and precision in distinguishing between two locations. Thus RSS fingerprints can be very similar in two different locations due to the signal power fluctuations. CIR, CTF and FCF provide robust fingerprints but the techniques require storage of matrices and pattern recognition between matrices. For example, when comparing two fingerprints, samples of the CIR, CTF or FCF matrices have to be compared against each other which can be computationally intensive for medium to large size databases (typical indoor environments). Similarly, the storage requirements can be prohibitive.

The RSS-based localization technique, although simple, suffers from low precision due to the significant fluctuation of power due to multipath and shadowing. The more robust CIR, CTF or FCF based fingerprinting techniques exhibit higher accuracy but suffer from computational and storage burdens due to the manipulation and storage of large matrices (especially for medium-large indoor areas).

FIG. 2 provides an overview of known methods of constructing a fingerprint in a given location. In step (a) a mobile terminal at location X conducts measurements to 3 APs and captures RF signals. In step (b) channel metrics are extracted from the 3 RF signals and a fingerprint is created. For RSS-based fingerprinting in this example, the fingerprint will be a vector of 3 RSS values, while for CIR- and FCF-based fingerprinting in this example the fingerprint will be a matrix with dimension 3 by N, where N is the number of samples in the CIR or the FCF vector.

In addition to the type of collected signal parameters, existing location fingerprinting techniques vary according to the pattern recognition/position estimation approach used. The most popular are probabilistic methods, k-nearest neighbor (kNN), neural networks, support vector machine (SVM) and smallest M-vertex polygon (SMP) [13].

An overview of these different pattern recognition techniques will be given. Although most of them are RSS-based techniques, the extension to CIR- or FCF-based techniques can be easily implemented.

One of the earliest RSS-based fingerprinting methods is the RADAR system [3]. The basic idea behind the RADAR system is to create an offline database composed of RSS measurements from overlapping coverage of APs. In the online phase the system employs the nearest neighbor algorithm where the measured RSS vector is compared to the database of stored RSS vectors and the position related to the shortest Euclidean distance is chosen as the estimated position.

The nearest neighbor technique can be also extended to the kNN where the algorithm returns the location estimate as the average of the coordinates of the k training locations whose fingerprint vectors have shortest Euclidean distances to the online RSS vectors. A similar RSS-based fingerprinting technique that weighs the k nearest neighbors by the reciprocal of their signal space Euclidean distance to the RSS vectors in the database has been proposed in [14]. RSS-based fingerprinting techniques that are based on a probabilistic approach have been reported in [15, 16, 17, 18], where the conditional expectation is used as the estimator which minimizes the conditional mean square error. The training data are used to construct the probability density function (PDF) for the location and the fingerprint vectors. Mathematical expressions of the location estimate are close to the Nadaraya-Watson Kernel Regression estimator but the elements of the fingerprint vector are assumed to be statistically independent from each other (simplicity of computation but not always true in practice).

In [19], the authors propose a joint clustering RSS-based technique for indoor localization based on a probabilistic method.

In [20], the authors introduce the LOCATOR algorithm which is an RSS-based fingerprinting technique but incorporates different approaches. Specifically, in the radio map building phase, the radio map is subdivided into clusters to reduce the computation cost in the location estimation phase. The authors further use RSS distribution functions, clustering and interpolations to improve the performance.

In [21] the Horus RSS-based fingerprinting technique models the RSS distribution received from APs using parametric and non-parametric distributions and exploits this information to reduce temporal variations.

Neural network pattern recognition techniques for RSS-based location fingerprinting have been reported in [22, 23]. RSS-based fingerprinting techniques based on support vector machines have been reported in [24, 25].

Recently the authors in [26] demonstrated further improvements to RSS-based fingerprinting by using an averaging technique in the logarithmic spectrum domain to mitigate the noise resulting from the multipath.

Performance evaluation of different RSS-based fingerprinting techniques is presented in [27]. Specifically, the authors compare the performance of probabilistic method, kNN and neural networks as the three most popular machine techniques. The results of analysis and experiments reveal that kNN reports the best overall performance for indoor positioning. The performance of histogram, nearest neighbor, parametric and kernel location fingerprinting techniques were evaluated in [28, 29]. The results revealed that the performance of the nearest neighbor technique fared the same or better than the other techniques depending on the scenario.

In typical fingerprinting-based location systems a fingerprint database is created in an offline stage by constructing the fingerprints/signatures (through measurement of channel parameters such as RSS or CIR/CTF) in different locations across a grid. In the online phase a mobile terminal in an unknown location constructs a fingerprint by measuring channel parameters such as RSS or CIR to all APs within its coverage. This measured fingerprint is then compared to the offline database and the position is estimated using pattern recognition techniques. The simplest pattern recognition technique is the closest neighbor where the position is estimated by selecting the location of the fingerprint in the database that is the closest (smallest distance in vector space) to the online measured fingerprint.

The fingerprint database is typically created by gridding a floor of a room/office in a given indoor environment. The grid is composed of N locations that are spaced by $\Delta$. Note that a smaller $\Delta$ means denser grid that increases the cost of the site survey and increases the amount of data stored. For some channel parameters it might seem that the denser the grid the better the performance. For RSS-based fingerprinting techniques, it has been shown that increasing the density of the grid beyond a certain point can improve the accuracy but not the precision or probability of correctly matching the fingerprint because two points on the grid are too close to one another and maybe very similar [44].

The coordinates of a location on the grid are $p^j=[x_j, y_j]^T$ where $x_j$ and $y_j$ are the x- and y-coordinates of the $j^{th}$ location and $j \in [1, N]$. The fingerprint/signature at each grid location is given by the vector $Z^j=[z_1^j, \ldots, z_M^j]^T$ and each element is a measured parameter of the channel (e.g. RSS) from one of the $m^{th}$ APs where $m \in [1, M]$ and M is the total number of APs. In realistic situations it is common that in a given grid location some APs will be too far to be detected and as a result a zero can be inserted for the element where the $m^{th}$ AP cannot be detected, i.e. the $j^{th}$ grid point $p^j$ is out of the $m^{th}$ AP's coverage. In the pattern recognition stage, an estimate of the position $\hat{p}=[\hat{x}, \hat{y}]^T$ can be determined by the choosing the closest neighbor or the offline fingerprint, $Z^j$, with the minimum Euclidean distance to the online fingerprint $v=[v_1, \ldots, v_M]^T$ which is given by $$d_{min} = \underset{p^j}{\operatorname{argmin}}\{\|Z^j - v\|\} \qquad (1)$$

where the position that minimizes (1) is the estimate, that is $\hat{p}=p^j$. $Z^j$ and v are M×1 vectors in the case the elements are scalar RSS measurements and M×$N_s$ matrices when the fingerprints are constructed from CIRs or CTFs/FCFs vectors where $N_s$ is the number of samples. Note that using CIR or CTFs as fingerprints increases the memory storage and processing requirements. In practice, Z is usually a vector (or matrix) of averaged channel parameters while v is a vector (or matrix) of instantaneous channel measurements. The performance of pattern recognition can be improved when both the online and offline fingerprints are average of the channel parameters, but this is not always feasible in practice.

An improvement to (1) is the kNN technique [4] which estimates the position as a weighted sum of the positions corresponding to the k minimum distance fingerprints on the grid. The kNN can be iteratively determined by [30]:

$$N_k = \underset{p^j \in N}{\operatorname{argmin}}\{[\|Z^j - v\|] \setminus p^j \notin N_{k-1}\} \qquad (2)$$

The estimated position is then given by (3)

$$\hat{p} = \frac{\sum_{i=1}^{k}(1/d_i)p_i}{\sum_{i=1}^{k}(1/d_i)} \qquad (3)$$

where $d_i = \|Z^i - v\|$ is the Euclidean distance between the $i^{th}$ position in the grid and the online fingerprint.

More complicated pattern recognition algorithms have been proposed such as the probabilistic (conditional mean)/Bayesian [15-18], parametric and non-parametric distribution [11, 21], neural network [4, 22, 23] and support vector machines [24, 25].

A performance evaluation of different pattern recognition techniques for RSS-based fingerprinting has been reported in [27] which compared kNN, probabilistic method and neural networks. The results of simulations revealed that the kNN reported the best overall performance for indoor fingerprint localization. In addition [28, 29] evaluated the performance of nearest neighbor, parametric and kernel location fingerprinting techniques and the results showed that nearest neighbor performs as well or better than the other techniques depending on the scenario.

SUMMARY OF THE INVENTION

An exemplary aspect of the present invention provides a method of locating a wireless communications device, the method including the steps of: calculating an estimate of the entropy of a function of the wireless communications channel between the wireless device and an access point for said wireless device; comparing said estimate of entropy against a plurality of previously obtained measurements or estimates of the entropy of said function for known locations; and determining a location of said wireless device based on said comparison.

A further exemplary aspect of the present invention provides a method of locating a wireless device, the method including the steps of: calculating a plurality of estimates of the entropy of a plurality of channel transfer functions of a plurality of wireless communications channels, each of said wireless communication channels being a channel between the wireless device and an access point for said wireless device; and comparing said estimates of entropy against a plurality of previously obtained measurements or estimates of the entropy of said channel transfer functions; and determining the location of said wireless device based on said comparisons.

A further exemplary aspect of the present invention provides a system for determining a location of a wireless communication device, the system including: at least one access point arranged to communicate with said wireless device over a wireless communication channel; a memory storing a plurality of associations between known locations and previously obtained measurements or estimates of the entropy of a function of said wireless communication channel; a control unit arranged to calculate an estimate of the entropy of said function of said wireless communication channel and to determine a location of the wireless device based on said estimate and the contents of said memory.

A further exemplary aspect of the present invention provides a wireless communication device arranged to communicate with at least one access point over a wireless communication channel, the wireless device having: a communication unit for communicating with said access point; and a control unit for estimating or calculating a function of said wireless communication channel, wherein the control unit communicates with a central control unit through said communication unit and said access point to determine a location of the wireless communication device based on an estimate of the entropy of said function compared to stored associations between a plurality of locations and previously obtained measurements or estimates of the entropy of said function.

BRIEF DESCRIPTION OF THE DRAWINGS

Embodiments of the invention will now be described by way of example with reference to the accompanying drawings in which.

DETAILED DESCRIPTION

Figure 1A:
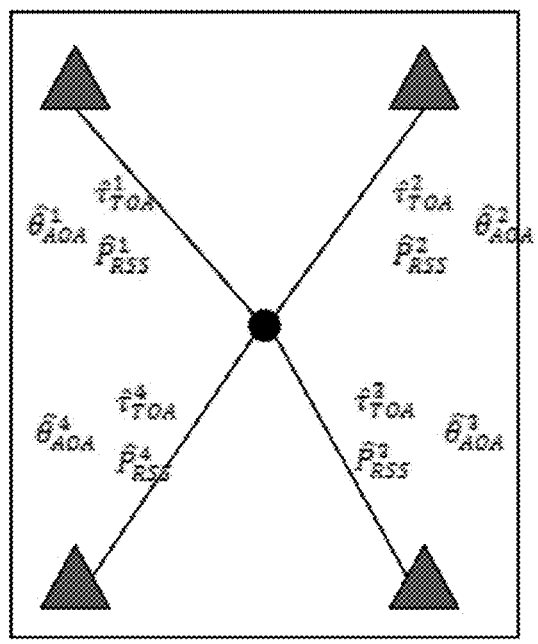
FIG. 1 shows two alternative approaches to localization as known in the prior art and has already been described.
Figure 1B:
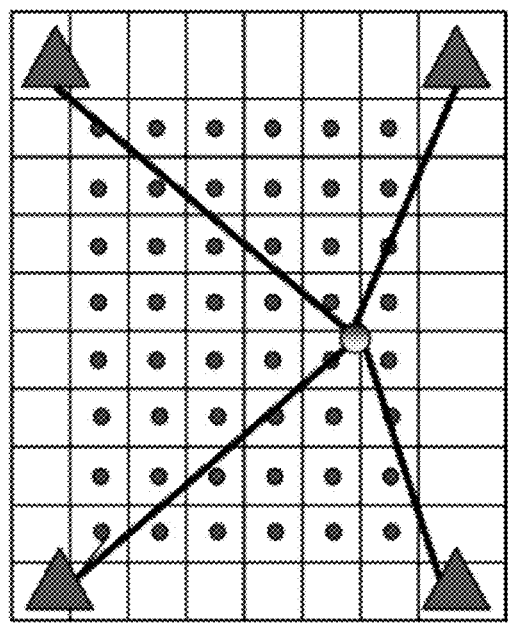
Figure 2:
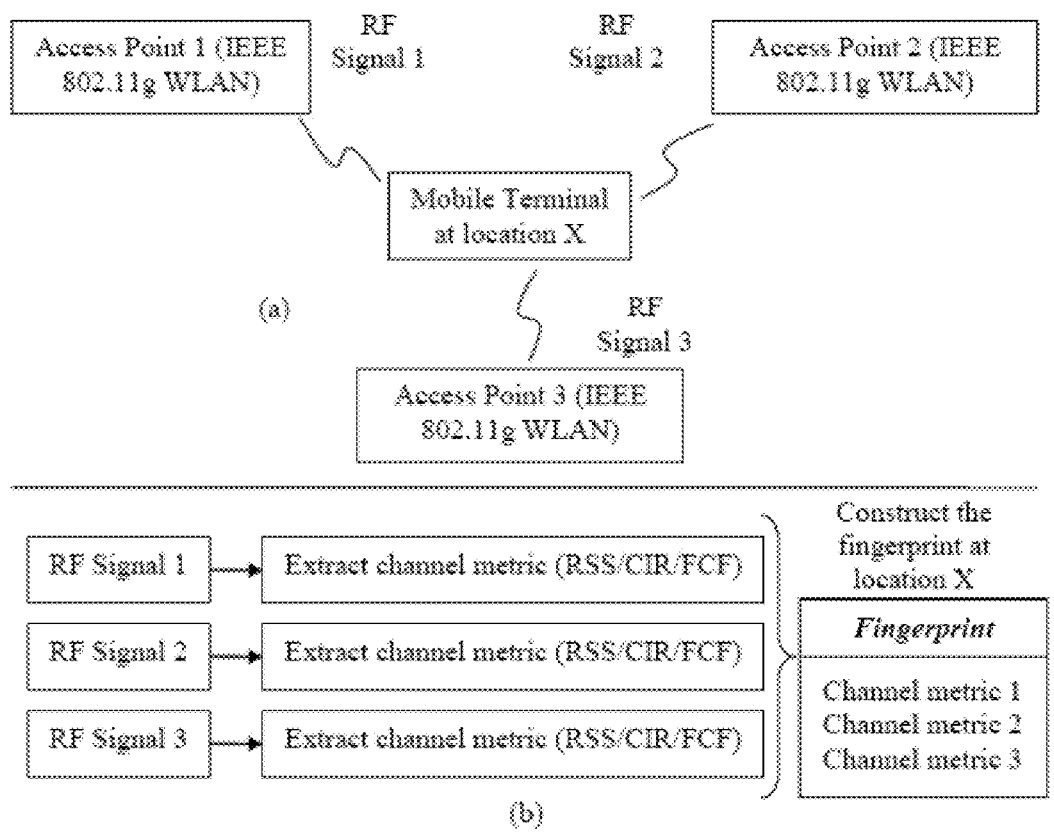
FIG. 2 shows an overview of known methods of constructing fingerprints for use in localization and has already been described.

Aspects of the present invention seek to provide a novel location fingerprinting technique that provides a more robust fingerprinting structure which reduces computation complexity and storage requirements.

Preferably these objectives are achieved by methods and systems which efficiently capture channel information in order to uniquely and robustly locate the receiver but significantly reduce the computational and storage requirements.

Accordingly, at its broadest, a first aspect of the present invention provides a method of locating or localizing which makes use of an entropy estimation of a function of one or more communication channels between a mobile or wireless device and an access point.

A first aspect of the present invention preferably provides a method of locating a wireless communications device, the method including the steps of: calculating an estimate of the entropy of a function of the wireless communications channel between the wireless device and an access point for said wireless device; comparing said estimate of entropy against a plurality of previously obtained measurements or estimates of the entropy of said function for known locations; and determining a location of said wireless device based on said comparison.

Preferably the function of the wireless communications channel contains unique multipath information between the mobile device and the access point. The calculation of an estimate of the entropy of that function makes it possible to capture that multipath information in a single entropy value.

Preferably the function of the wireless communications channel is a realization of a random process (random in space and time). This makes it more likely that the entropy estimate will be able to uniquely distinguish between two known locations.

In addition to providing robust localization capabilities, the method of the present aspect can reduce or eliminate the need for manipulation and storage of matrices thus reducing complex computation in the comparison and determination steps (the pattern recognition stage) and reducing storage requirements of the previously obtained measurements or estimates of the entropy.

Preferably the function of the wireless communications channel which is used to calculate the estimate of entropy is the channel transfer function which has all of the above preferred qualities of such a function. In a typical wireless local-area network (WLAN) system implementing orthogonal frequency-division multiplexing (OFDM) such as IEEE 802.11 b/g, the channel estimation in the frequency domain is readily available, since it is already computed for channel equalization. As such calculation of the entropy estimate from the channel transfer function can reduce the amount of processing required to produce the entropy estimate.

Furthermore, by providing a method that can be practically integrated in existing OFDM-based WLAN systems the requirement for additional hardware components can be reduced or eliminated.

In some embodiments, the method further includes the step of estimating said function of the wireless communication channel prior to estimating its entropy. In certain arrangements and for certain functions of the channel, it may be preferable (and possibly easier or quicker) to estimate the function of the channel. This estimate can then be used as the basis for the entropy estimation.

The estimate of entropy calculated may be a time-averaged estimate of said entropy. Use of a time-averaged estimate of the entropy over a time period prior to the determination of the location of the wireless device may allow for improved accuracy in the estimation of the entropy and therefore improved accuracy in the determination of the location of the device.

In certain embodiments of this aspect, the step of determining selects the known location for which the previously obtained measurements or estimates of the entropy are closest to the calculated entropy estimate for the wireless device. The determination of "closest" may be done in any one of a wide range of techniques which are known in pattern matching/pattern recognition.

Indeed, any pattern recognition technique can be used in the steps of comparing and determining. For example the simple nearest-neighbor approach may be adopted or more complex probabilistic and neural network approaches may be used. The preferred pattern recognition technique to be used is the low-complexity k-nearest neighbour (kNN) method. In such a method the minimum Euclidean distances between the current entropy estimate for the wireless device and the previously obtained (offline) entropy estimates are computed and incorporated in a weighted scheme to estimate the location. It has been shown in simulations that the kNN method achieves the best overall performance for indoor fingerprint localization.

Preferably the method is implemented in relation to an indoor environment and so the wireless device is in an indoor location when the method of location is being carried out. The method of this aspect has particular usefulness in an indoor environment as it is not reliant on positioning signals from a global source (e.g. GPS), which may not penetrate to the indoor environment. Furthermore, as the method preferably makes use of an entropy estimate to determine the location of the wireless device, the non-availability of line-of-sight (LOS) communication with the access point (e.g. as resulting from walls, furniture etc.) does not cause errors in the location determined.

The method of this aspect may further include the steps of: obtaining measurements or estimates of the entropy of said function for a plurality of known locations; and storing the measurements or estimates in association with the respective locations as said plurality of previously obtained measurements or estimates. These additional steps represent the "offline phase" of data collection in order to provide correspondences between location and entropy estimates or calculations which are subsequently used in the "online phase" of locating a wireless device.

The method may make use of the presence of more than one access point which is in communicative contact with the wireless device. In this situation the method may calculate a plurality of estimates of the entropy of a function of each of a plurality of wireless communications channels, each of said wireless communication channels being a channel between the wireless device and an access point for said wireless device; and compare said estimates of entropy against a plurality of previously obtained measurements or estimates of the entropy of said channel transfer functions; and determine the location of said wireless device based on said comparisons.

Preferably, where there are a plurality of access points, the step of calculating an estimate includes creating a fingerprint vector containing the estimated entropy to multiple access points and that entropy vector (entropy fingerprint) is then compared against the plurality of previously obtained measurements or estimates of the entropy.

Use of a greater number of entropy estimates for separate communications channels can increase the accuracy of the location determination as the uniqueness of each position can be better defined. However, if too large a number of possible communications channels are used as the basis for entropy estimates, then the computation requirements may increase without significant gains in the accuracy of the localization. Accordingly, if the number of communications channels available exceeds a certain number, it may be preferable to select only a predetermined number (which is preferably the same as that certain number) of communications channels for which to calculate entropy estimates.

Embodiments of this first aspect may include some, all or none of the above described optional or preferred features.

At its broadest, a second aspect of the present invention provides a system for locating or localizing a wireless device which makes use of an entropy estimation of a function of one or more communication channels between the device and an access point.

Accordingly a second aspect of the present invention preferably provides a system for determining a location of a wireless communication device, the system including: at least one access point arranged to communicate with said wireless device over a wireless communication channel; a memory storing a plurality of associations between known locations and previously obtained measurements or estimates of the entropy of a function of said wireless communication channel; a control unit arranged to calculate an estimate of the entropy of said function of said wireless communication channel and to determine a location of the wireless device based on said estimate and the contents of said memory.

Preferably the function of the wireless communications channel contains unique multipath information between the mobile device and the access point. The calculation of an estimate of the entropy of that function makes it possible to capture that multipath information in a single entropy value.

Preferably the function of the wireless communications channel is a realization of a random process (random in space and time). This makes it more likely that the entropy estimate will be able to uniquely distinguish between two known locations.

In addition to providing robust localization capabilities, the system of the present aspect can reduce or eliminate the need for manipulation and storage of matrices thus reducing complex computation in the comparison and determination steps (the pattern recognition stage) and reducing storage requirements of the previously obtained measurements or estimates of the entropy.

Preferably the function of the wireless communications channel which is used to calculate the estimate of entropy is the channel transfer function which has all of the above preferred qualities of such a function. In a typical wireless local-area network (WLAN) system implementing orthogonal frequency-division multiplexing (OFDM) such as IEEE 802.11 b/g, the channel estimation in the frequency domain is readily available, since it is already computed for channel equalization. As such calculation of the entropy estimate from the channel transfer function can reduce the amount of processing required to produce the entropy estimate.

Furthermore, by providing a system that can be practically integrated in existing OFDM-based WLAN systems the requirement for additional hardware components can be reduced or eliminated.

In some embodiments, the system further includes the step of estimating said function of the wireless communication channel prior to estimating its entropy. In certain arrangements and for certain functions of the channel, it may be preferable (and possibly easier or quicker) to estimate the function of the channel. This estimate can then be used as the basis for the entropy estimation.

The estimate of entropy calculated may be a time-averaged estimate of said entropy. Use of a time-averaged estimate of the entropy over a time period prior to the determination of the location of the wireless device may allow for improved accuracy in the estimation of the entropy and therefore improved accuracy in the determination of the location of the device.

In certain embodiments of this aspect, the determination by the control unit selects the known location for which the previously obtained measurements or estimates of the entropy are closest to the calculated entropy estimate for the wireless device. The determination of "closest" may be done in any one of a wide range of techniques which are known in pattern matching/pattern recognition.

Preferably the access point is in an indoor location. The system of this aspect has particular usefulness in an indoor environment as it is not reliant on positioning signals from a global source (e.g. GPS), which may not penetrate to the indoor environment. Furthermore, as the method preferably makes use of an entropy estimate to determine the location of the wireless device, the non-availability of line-of-sight (LOS) communication with the access point (e.g. as resulting from walls, furniture etc.) does not cause errors in the location determined.

Preferably the wireless device, communications channel and access point form part of a wireless LAN system, in particular the existing WLAN infrastructure that exists in many indoor locations such as offices. More preferably the wireless device, communications channel and access point form part of an existing OFDM-based WLAN system, thereby reducing the requirement for additional hardware components.

In particular embodiments the wireless device may be a mobile telephone, PDA, tablet computer, netbook or other mobile communications device.

In certain embodiment, the control unit is arranged to send the determined location of the wireless communications device to said device through said access point. This allows a person using the wireless device to know the determined location and may assist that person in navigating through an unfamiliar building or office layout to reach a desired destination.

The system may have more than one access point which is in communicative contact with the wireless device. In this situation the control unit may be arrange to calculate an estimate of the entropy of a function of each of a plurality of wireless communications channels, and to determine the location of said wireless device based on said comparisons.

Use of a greater number of entropy estimates for separate communications channels can increase the accuracy of the location determination as the uniqueness of each position can be better defined. However, if too large a number of possible communications channels are used as the basis for entropy estimates, then the computation requirements may increase without significant gains in the accuracy of the localization. Accordingly, if the number of communications channels available exceeds a certain number, it may be preferable to select only a predetermined number (which is preferably the same as that certain number) of communications channels for which to calculate entropy estimates.

The system may also include one or more wireless communication devices. Such wireless communication devices are preferably wireless communication devices according to the third aspect below, and may include some, all or none of the above described optional or preferred features of that aspect, but do not need to be.

Embodiments of this second aspect may include some, all or none of the above described optional or preferred features.

Embodiments of this second aspect preferably operate by carrying out a method according to the above first aspect, which may include some, all or none of the above described optional or preferred features of that aspect.

At its broadest, a third aspect of the present invention provides a wireless device which is configured to enable locating or localizing of the wireless device through use of an entropy estimation of a function of one or more communication channels between the device and an access point.

Accordingly a third aspect of the present invention preferably provides a wireless communication device arranged to communicate with at least one access point over a wireless communication channel, the wireless device having: a communication unit for communicating with said access point; and a control unit for estimating or calculating a function of said wireless communication channel, wherein the control unit communicates with a central control unit through said communication unit and said access point to determine a location of the wireless communication device based on an estimate of the entropy of said function compared to stored associations between a plurality of locations and previously obtained measurements or estimates of the entropy of said function.

In some embodiments, the determination of the estimate of the entropy of said function may be carried out by the control unit of the wireless device and then be sent to said central control unit (e.g. through said communication unit) so that the wireless device can then receive a determination of the location of the wireless communication device from the central control unit.

In other embodiments, the control unit sends said estimated or calculated function to said central control unit and receives a determination of the location of the wireless communication device from the central control unit.

Thus it is possible to split the level of processing required between the control unit of the wireless device and the central control unit (and in some embodiments, it may be possible to do this dynamically based on processing loads in each of the control units).

The wireless communication device may further include a display, wherein the control unit is arranged to display said determined location on said display. This allows a person using the wireless device to know the determined location and may assist that person in navigating through an unfamiliar building or office layout to reach a desired destination.

Embodiments of this third aspect may include some, all or none of the above described optional or preferred features.

Embodiments of this third aspect preferably operate by carrying out a method according to the above first aspect, which may include some, all or none of the above described optional or preferred features of that aspect.

Entropy Estimation of Signals

Before turning to embodiments of the invention, the underlying principles of entropy estimation on which embodiments of the invention are based will be reviewed.

From information theory the entropy of a random variable X is given by [31]

$$H(X) = -E_X[\log_2 p_X] = \int_{-\infty}^{\infty} p_X(x)\log_2 p_X(x)dx \qquad (4)$$

where $p_X(x)$ is the PDF of X. In practice, direct evaluation of the entropy according to equation (4) above is difficult because it is not easy to compute or estimate the entropy from real data. Typical methods of estimating the entropy rely on estimating the PDF through histograms [33, 34], order statistics [35, 36] or kernel methods [37, 38].

A more practical and efficient alternative technique to estimate the entropy of a random signal has been proposed by [32]. The proposed signal processing technique computes an estimate of entropy by estimating the PDF of the random variable. It has been proposed in [32, 39] that the PDF of a random variable X can be estimated simply by appealing to the theory of Power Spectral Density (PSD) estimation. An estimate of the PDF $\hat{p}_X(x)$ can be parameterized by a set of coefficients $\{a_k\}$ of an autoregressive (AR) model in the form of a PSD $S_W(x)$, where $1 \leq k \leq p$ is the number of parameters [32, 39] or $$\hat{p}_X(x) = S_W(x) = \frac{\sigma_W^2}{\left|1 - \sum_{k=1}^{p} a_k e^{-j2\pi kx}\right|^2} \qquad (5)$$

where $\sigma_W^2$ is designed such that $\int_{-1/2}^{+1/2} S_W(f)df = 1$ since PSDs are different from PDFs in that they do not usually integrate to 1. The bounded support $[-\frac{1}{2}, \frac{1}{2}]$ ensures that the random variable is constrained between these values, since a general PDF is not periodic with period one as is imposed by the AR model [39]. This can be easily achieved by normalizing the data by $k\sigma_W$ where $\sigma_W$ is the standard deviation and k is a suitable parameter [39].

One way to clarify the modelling of the PDF by a PSD is to note that if $X(\omega, n)$ is a random process then we can find a process $W(\omega, n)$ that has a PSD that matches $p_X(x)$. One such process is $W(\omega, n) = e^{j(nX + \phi(\omega))}$ where $\phi(\sigma)$ is uniformly distributed over $[0, 2\pi]$ and independent of X [32]. It can be easily shown that the autocorrelation of W, $R_W(k)$, is the first characteristic function of X. The relationship between the PDF and the PSD can then be highlighted through the following Fourier Transform relationships $$R_W(k) \xrightarrow{F} S_W(x) \qquad (6b)$$

$$\phi_x(k) \xrightarrow{F} p_X(x)$$

It is clear that if the autocorrelation $R_W(k)$ is equal to the $\phi_x(k)$ then $p_X(x) = S_W(x)$. As a result to estimate the PDF $\hat{p}_X(x)$ we can find an AR model of the form in (5). The parameterization in (5) is possible since a large enough model order can be shown to be capable of modeling any PDF in the $\|\cdot\|_\infty$ sense [32].

In order to estimate the model parameters in (5) based on available data $\{x_1, x_2, \ldots, x_{N_s}\}$ it is well known that the Yule-Walker equations relate the AR model parameters to the autocorrelation function [40]. The autocorrelation function in this case is the samples of the characteristic function given by [39]

$$F^{-1}\{p_X(x)\} = \phi_x(k) = E[e^{j2\pi xk}] = R_W(k) \qquad (7)$$

where $\phi_x(k)$ is the characteristic function and $R_W(k)$ is the autocorrelation function of the underlying process W related to the PSD $S_W(x)$. The autocorrelation function essentially becomes samples of the characteristic function and in the remainder of the report $\phi_x(k)$ and $R_W(k)$ will be used interchangeably and they both refer to (8). To estimate the AR model parameters (ultimately estimate the PDF) we need to estimate the autocorrelation of the random process which can be given by the sample moment estimator $$\hat{R}_W(k) = \frac{1}{N_s} \sum_{n=0}^{N_s-1} e^{j2\pi kx(n)} \qquad (8)$$

where $k=0, \ldots, p$ and $N_s$ is the number of samples in the data vector. The AR model parameters can then be found by solving the Yule-Walker equations [39, 40]

$$\hat{R}_W \hat{a} = \hat{r}_W \quad (9)$$

$$\begin{bmatrix} \hat{R}_W(0) & \hat{R}_W(-1) & \ldots & \hat{R}_W(-(p-1)) \\ \hat{R}_W(1) & \hat{R}_W(0) & \ldots & \hat{R}_W(-(p-2)) \\ \vdots & \vdots & \ddots & \vdots \\ \hat{R}_W(p-1) & \hat{R}_W(p-2) & \ldots & \hat{R}_W(0) \end{bmatrix} \begin{bmatrix} \hat{a}(1) \\ \hat{a}(2) \\ \vdots \\ \hat{a}(p) \end{bmatrix} = \begin{bmatrix} \hat{R}_W(1) \\ \hat{R}_W(2) \\ \vdots \\ \hat{R}_W(p) \end{bmatrix}$$

using the Levinson-Durbin recursion. An estimate of $\hat{\sigma}_W^2$ can be computed (once $\hat{a}_k$ are estimated) using $$\hat{\sigma}_W^2 = \hat{R}_W(0) - \sum_{k=1}^{p} \hat{a}(k) \hat{R}_W(-k) \quad (10)$$

which can also be computed using the Levinson-Durbin recursion.

Once the AR parameters of the PSD that models the PDF are computed then the estimate of entropy can be computed by $$\hat{H} = \int_{-1/2}^{1/2} \hat{p}_X(x) \log_2 \hat{p}_X(x) dx = \int_{-1/2}^{1/2} S_W(x) \log_2 S_W(x) dx \quad (11)$$

A more relevant/practical expression can be obtained using Plancherel-Parseval formula to the right-hand side of (11) [32] which yields $$\hat{H} = -\sum_{k=-\infty}^{\infty} R_W(k) C_W^*(k) \quad (12)$$

where $R_W(k)$ is the $k^{th}$ correlation coefficient and $C^*_W(k)=F^{-1}\{\log_2 S_W(x)\}$ is the $k^{th}$ component of its cepstrum [40]. Since $S_W(x)$ is real, both $R_W(k)$ and $C^*_W(k)$ have Hermitian symmetry and thus (12) can be given by $$\hat{H} = -2\text{Re}\left\{ \sum_{k=0}^{\infty} R_W(k) C_W^*(k) \right\} \quad (13)$$

Both $R_W(k)$ and $C^*_W(k)$ can be computed recursively or $$R_W(k) = \sum_{i=1}^{p} a_i R_W(k-i) + \sigma_W^2 \delta(k) \quad (14)$$

$$C_W(k) = \begin{cases} \log \sigma_W^2, & \text{if } k = 0 \\ h(k) - \sum_{i=1}^{k-1} \left(\frac{i}{k}\right) C_W(i) h(k-i), & \text{if } k > 0 \end{cases} \quad (15)$$

where h(k) is the impulse response of the AR system and it also can be computed recursively $$h(k) - \sum_{i=1}^{p} a_i h(k-i) + \delta(k) \quad (16)$$

Figure 3:
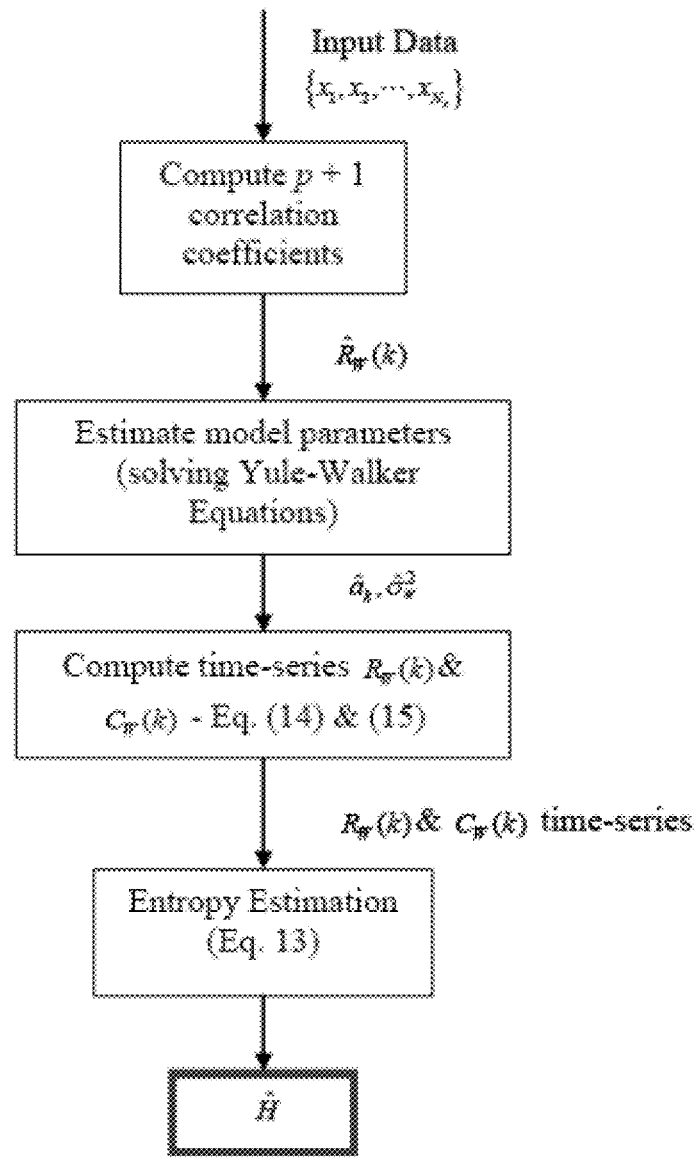
FIG. 3 shows an overview of a process of estimation of the entropy of a channel transfer function according to an embodiment of the present invention.

The entropy estimation procedure of an input sequence of data $\{x_1, x_2, \ldots, x_{N_s}\}$ summarized in FIG. 3.

In practice, modelling a PDF accurately using the AR technique requires a long AR model, i.e. large number of AR coefficients. It is well known from spectral estimation theory that too low a model order will produce inadequate resolution which yields to estimator bias and a high model order results in loss of stability of the estimate which produces spurious peaks, i.e. large variance [32, 39]. To address the long AR model problem, the AR parameters can be obtained as a regularized least-squares solution [32, 41]

$$\hat{a} = (\hat{R}_W + \lambda \Gamma_k)^{-1} \hat{r}_W \quad (17)$$

where $\Gamma_k$ is the diagonal matrix with elements $[\Gamma_k]_{ii} = i^{2k}$ incorporating the prior knowledge about the "smoothness" of the spectrum, see [41] for further details. $\lambda$ is a hyperparameter that balances a fidelity to the data and a smoothness prior [41]. A selection rule for $\lambda$ has been derived in [41, 42] which minimizes the following marginal likelihood $$L(\lambda) = \log(\det(\hat{R}_W + \lambda \Gamma_k)) - p \log \lambda - N \log(\sigma_W^2) \quad (18)$$

where $\sigma_W^2$ ensures that the AR probability distribution is properly normalized.

Recursive Implementation

Most of the entropy estimation equations in the previous section can be computed recursively. The correlation sequence in (8) can be estimated recursively by $$R_W^{N_s}(k) = \frac{1}{N_s} \sum_{n=0}^{N_s} e^{j2\pi k x(n)} = \frac{N_s - 1}{N_s} R_W^{N_s - 1}(k) + \frac{1}{N_s} e^{j2\pi k x(N_s)} \quad (19)$$

Adaptive entropy estimation can be achieved by recursively computing the autocorrelation matrix [32]

$$\hat{R}_W^{n+1} = \frac{1}{n+1} \left[ n\mu \hat{R}_W^{(n)} + \zeta(n+1)\zeta(n+1)^T \right] \quad (20)$$

where $\mu$ is a forgetting factor and $\zeta(n+1)^T = [e^{j(x_{n+1}\Phi)}, \ldots, e^{j(px_{n+1}|\Phi)}]$. The AR parameters can also be recursively computed, which avoids matrix inversion required in (17). The recursive regularized least squares solution can be computed using a gradient approach [32]

$$\hat{a}^{(n+1)} = \hat{a}^n + \beta(\hat{R}_W^{(n)} + \lambda \Gamma_k) \hat{a}^{(n)} - \hat{r}_W^{(n)} \quad (21)$$

At each stage after updating the autocorrelation function and computing the recursive model parameters equations (13)-(15) can be used to compute the entropy recursively.

Entropy-Based Location Fingerprinting in OFDM-Based WLAN Systems

In an embodiment of the present invention, a fingerprinting technique is provided that is based on the concept of entropy estimation of signals discussed above. The embodiment is preferably employed in an OFDM-based WLAN system.

The entropy of a signal, from information theory, measures the uncertainty associated with a random variable [31]. At each location in an indoor environment the CTF provides a unique spectral signature/fingerprint. Thus if we consider that the CTF is in fact random in both space and time, then samples of the CTF are samples of a random process.

As a result, each location will create a unique realization of the random process and thus the entropy of this random signal can reveal significant information regarding the uniqueness of the fingerprint. This approach is considered to be superior to the autocorrelation of the CTF [6, 12] since entropy is a more robust technique to detect abrupt changes in distributions [32]. In addition, the entropy fingerprint is an M×1 vector while the CTF autocorrelation is an M×$N_s$ matrix which reduces the storage and computation requirements significantly considering a grid covering large indoor areas.

With the ability to estimate entropy efficiently as highlighted in the previous section, entropy-based fingerprints can be practically constructed from measured CTFs between a mobile terminal and all available APs.

In a typical WLAN system implementing OFDM (orthogonal frequency-division multiplexing) such as IEEE 802.11 b/g, the channel estimation in the frequency domain is readily available, since it is already computed for channel equalization. Therefore, we can take advantage of the availability of the CTF estimation to compute the entropy of the channel.

Figure 4:
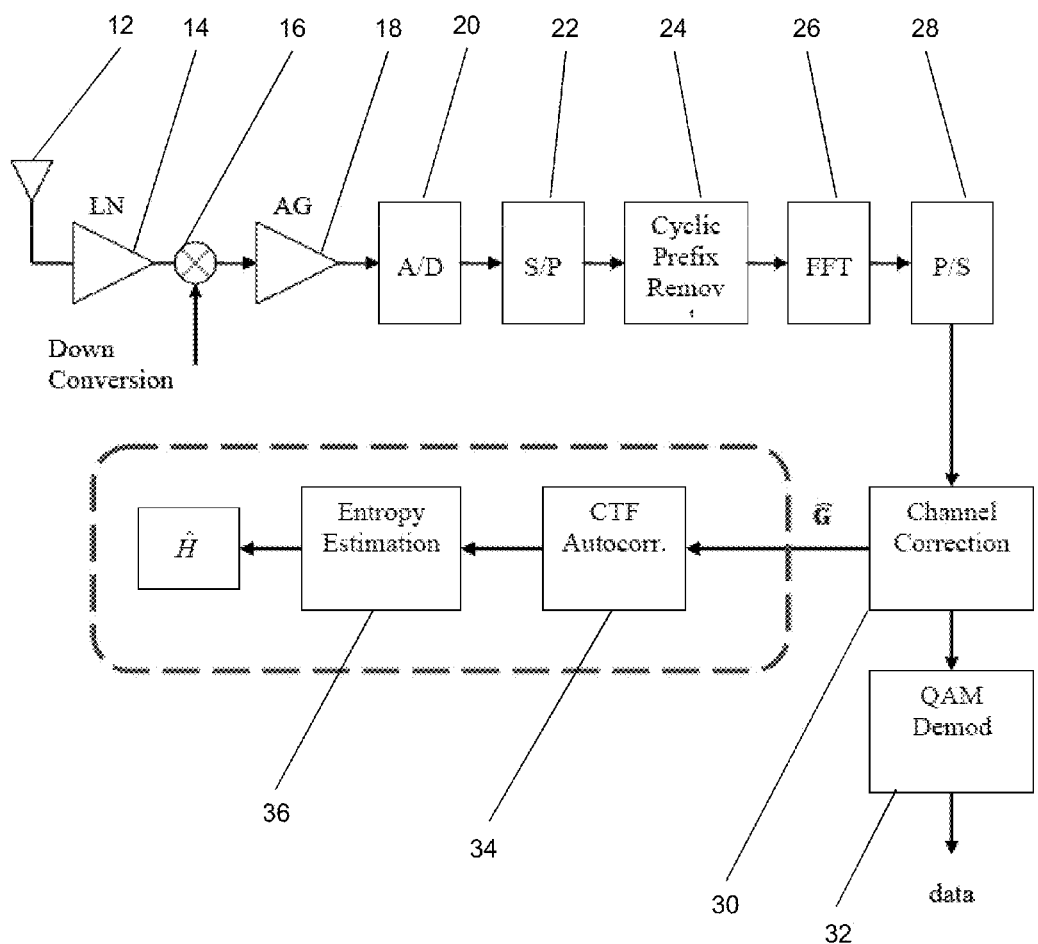
FIG. 4 shows, in schematic form, a typical OFDM-based WLAN receiver with additional components provided in order to produce an entropy estimate in accordance with an embodiment of the present invention.

FIG. 4 shows a block diagram of a typical OFDM-based WLAN receiver system which has an antenna 12 for receiving a signal which is subsequently processed by Low Noise (LN) Amplifier 14, Down Conversion (Multiplication) 16, Automatic Gain 18, analog-to-digital converter 20, Serial-to-Parallel (S/P) 22, cyclic prefix removal 24, fast Fourier transform 26, Parallel-to-Serial (P/S) 28, Channel Correction (Channel Estimation) 30 and a QAM demodulator 32 to extract the data from the signal.

In an embodiment of the present invention, additional system components are provided which allows for extraction of the CTF from the channel correction 30, autocorrelation 34 of the CTF and entropy estimation 36.

Typically all of the above components are provided by a control unit which is programmed to perform these functions, or by pre-arranged circuits in the control unit or both.

In an OFDM-based system there are typically $N_c$ subcarriers of which only $N_u$+1 are used for data at the centre of the given spectrum. The (($N_c-N_u$+1)/2 on each side are used as a guard band to avoid out-of band interference. Each subcarrier is modulated by a symbol $S_i^n$ where i is the index of the OFDM symbol and n is the subcarrier index. The bandwidth of an OFDM system is 1/T where T is the sampling interval and $T_s=T_u+T_G$ is the duration of the entire OFDM symbol while $T_u$ is the duration of the data within the symbol and $T_G$ is the guard interval. The subcarrier spacing is $\Delta f=1/T_u$ which means that $T=1/(\Delta f N_c)=T_u/N_c$.

The output baseband signal of the transmitter is given by [43]

$$s(t) = \sum_{i=-\infty}^{\infty} \sum_{n=-N_u/2}^{N_u/2} S_i^n P_i^n(t) \otimes g_T(t) \quad (22)$$

where $g_T(t)$ is the impulse response of the transmit filter, $\hat{x}$ is the convolution operation and $P_i^n(t)$ is the subcarrier pulse which can be described as $$P_i^n(t) = \begin{cases} e^{j2\pi \frac{n}{T_u}(t-T_G-iT_s)}, & T_s \le t < (i+1)T_s \\ 0, & \text{else} \end{cases} \quad (23)$$

The signal s(t) is transmitted over a Rayleigh multipath fading channel with an impulse response given by $$g(t, \tau) = \sum_{l=1}^{L} g_l(t)\delta(\tau - \tau_l) \quad (24)$$

where $g_l(t)$ and $\tau_l$ are the complex path gain and delay of the $l^{th}$ path and L is the number of multipath components. Note that $g_l(t)=\alpha_l e^{j\Phi}$ contains the amplitude $\alpha_l$ and phase $\phi_l$ information. The $n^{th}$ subcarrier output during the $i^{th}$ OFDM symbol is $$Y_i^n = S_i^n G_i^n G_T(n) G_R(n) + z_i^n, \; -N_u/2 \le n \le N_u/2 \quad (25)$$

where $G_i^n$ is $n^{th}$ sample of the CTF (DFT of the impulse response $g(t, \tau)$). $G_T(n)$ and $G_R(n)$ are the transmitter and receiver filter frequency response values at the $n^{th}$ subcarrier. $z_i^n$ is a white complex Gaussian noise with variance $\sigma^2$. We can assume that the $N_u$+1 subcarriers operate within the flat region of the transmitter and receiver filter frequency responses and as a result $G_T(n)=G_R(n)=1$. The output can then be given by $$Y_i^n = S_i^n G_i^n + z_i^n, \; -N_u/2 \le n \le N_u/2 \quad (26)$$

where $G_i^n$ is $$G_i^n = \sum_{l=1}^{L} g_l(iT_s)\exp\left(-\frac{j2\pi n \tau_l}{N_c T}\right) \quad (27)$$

which is the $n^{th}$ sample of CTF (one of the $N_u$+1 subcarriers). $iT_s$ is the duration of the $i^{th}$ OFDM symbol. Thus for the $i^{th}$ symbol it is possible to extract samples of the CTF from the received signal or $G_i=[G_i^1, G_i^2, \ldots, G_i^{N_s}]^T$ where $N_s$ is the number of samples in the CTF. In OFDM systems the CTF is commonly estimated by using pilot signals and in the case that all subcarriers in the OFDM symbol are used as pilots then $N_s=N_u$. It is typically assumed that the guard interval duration is longer than the channel maximum excess delay or $T_G>\tau_{max}$ which means that the channel is quasi-stationary and the channel does not change within one OFDM symbol but may vary between symbols [43]. Thus the estimated CTF can be considered a random process in both space (channel structure vary randomly with location) and time (corrupted by a white noise process) and at the $j^{th}$ location it can be modeled by $$\hat{G}^j = G^j + w \quad (28)$$

where w is a random white process modeling the noise with zero mean and standard deviation $\sigma_w$. The CTF estimate can be obtained from one transmitted/received OFDM symbol or over an average of N OFDM symbols. In either case, a CTF estimate $(\hat{G}^j)_m$ for the channel between a transmitter at location j and the $m^{th}$ AP can be used to estimate the respective entropy of the channel $\hat{H}_m^j$. The entropy estimation technique introduced in the previous section forms the basis of our proposed entropy-based location fingerprinting. The fingerprint for each location on the grid will then be composed of a vector of entropy measurements from each AP or $Z^j=[z_1^j, \ldots, z_M^j]^T=[\hat{H}_1^j, \ldots, \hat{H}_M^j]^T$ where $$\overline{H}_m^j = \frac{1}{N}\sum_{n=1}^{N}(\hat{H}_m^j)_n$$

is the time averaged (over N symbols) entropy estimate from the $m^{th}$ AP at location j. The instantaneous online fingerprint is similarly given by $v=[v_1, \ldots, v_M]^T=[\hat{H}_1, \ldots, \hat{H}_M]^T$.

Figure 5:
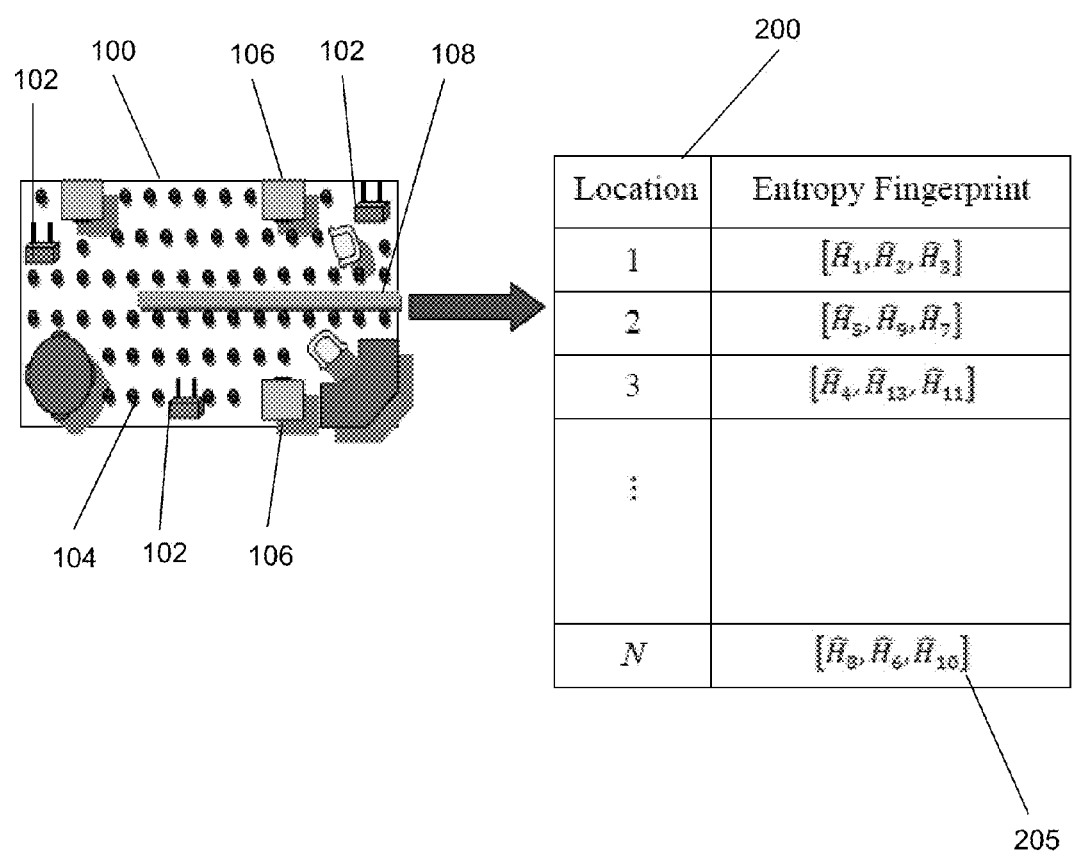
FIG. 5 shows, in schematic form, the construction of an offline database for entropy-based fingerprinting according to an embodiment of the present invention.

FIG. 5 illustrates the process of creating a database of the entropy fingerprints in a typical indoor office layout 100. The office has a selection of office furniture, including cabinets 106 and a partition wall 108. Three wireless access points 102 are provided in the office. However, due to the presence of the wall 108 and the other office furniture, many locations in the office do not have line-of-sight (LOS) communication with any of the access points.

In an offline phase, a notional grid 104 is superimposed on the office and a wireless device (not shown) is systematically positioned at each of the points on the notional grid and the entropy of the channel between the wireless device and each of the access points is recorded or estimated and combined as a vector (the entropy fingerprint 205). In the preferred embodiment, the entropy of the CTF is calculated for the reasons set out above. The database 200 stores the correspondence between each location on the grid (which may be numbered sequentially as shown, or may take a coordinate form) and the entropy fingerprint recorded or estimated for that location.

Note that elements of the entropy fingerprint vector 205 are unique to the multipath structure between the mobile terminal and the AP. In this case each fingerprint contains three entropy estimates corresponding to each of the APs 102. The entropy fingerprint is a vector but the values contain unique information about the propagation channels between the mobile terminal and each AP. Entropy based fingerprinting can therefore provide the simplicity of the RSS-based method (it is an M×1 vector rather than a matrix) but the multipath channel information of the CIR- or FCF-based approaches.

Once the fingerprint database 200 is constructed in the offline phase, position estimation in the online phase can be achieved through any known pattern recognition technique. The preferred pattern recognition technique to be used is the low-complexity kNN method where the minimum Euclidean distances between the online entropy vector recorded for the wireless device and the offline entropy vectors stored in the database 200 are computed and incorporated in a weighted scheme to estimate the position. The details of the kNN pattern recognition technique were described above.

Although the embodiment above uses the CTF as the basis for the entropy calculation/estimation, other embodiments of the present invention can use other channel measurement metrics such as the CIR or the FCF.

The methods and systems described in the above embodiments are preferably combined and used in conjunction with each other.

The systems and methods of the above embodiments may be implemented in a computer system (in particular in computer hardware or in computer software) in addition to the structural components and user interactions described.

The term "computer system" includes the hardware, software and data storage devices for embodying a system or carrying out a method according to the above described embodiments. For example, a computer system may comprise a central processing unit (CPU), input means, output means and data storage. Preferably the computer system has a monitor to provide a visual output display (for example in the design of the business process). The data storage may comprise RAM, disk drives or other computer readable media. The computer system may include a plurality of computing devices connected by a network and able to communicate with each other over that network.

The methods of the above embodiments may be provided as computer programs or as computer program products or computer readable media carrying a computer program which is arranged, when run on a computer, to perform the method(s) described above.

The term "computer readable media" includes, without limitation, any medium or media which can be read and accessed directly by a computer or computer system. The media can include, but are not limited to, magnetic storage media such as floppy discs, hard disc storage media and magnetic tape; optical storage media such as optical discs or CD-ROMs; electrical storage media such as memory, including RAM, ROM and flash memory; and hybrids and combinations of the above such as magnetic/optical storage media.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

In particular, although the methods of the above embodiments have been described as being implemented on the systems of the embodiments described, the methods and systems of the present invention need not be implemented in conjunction with each other, but can be implemented on alternative systems or using alternative methods respectively.

REFERENCES

[1] K. Pahlavan, X. Li and J. P. Makela, "Indoor geolocation science and technology", *IEEE Communications Magazine*, vol. 40, issue 2, pp. 112-118, February 2002.
[2] K. Pahlavan, F. O. Akgul, M. Heidari, A. Hatami, J. M. Elwell, R. D. Tingley, "Indoor geolocation in the absence of direct path", *IEEE Wireless Communications*, vol. 13, no. 6, pp. 50-58, December 2006.
[3] P. Bahl and V. Padmanabhan, "RADAR: an in-building RF-based user location and tracking system," in *Proc. IEEE INFOCOM*, vol. 2, pp. 775-784, March 2000.
[4] C. Nerguizian, C. Despins and S. Affes, "Geolocation in mines with an impulse response fingerprinting technique and neural networks," *IEEE Trans. Wireless Commun.*, vol. 5, pp. 603-611, March 2006.
[5] Nerguizian C., Despins, C., Affes S., Institut National de la Recherche Scientifique (2009), Method and System for Indoor Geolocation using an Impulse Response Fingerprinting Technique, U.S. Pat. No. 7,630,943.
[6] Bevan D. D., Averin I., Lysyakov D., Nortel Networks Limited (2010), RF Fingerprinting for Location Estimation, U.S. Pat. Application US 2010/0311436.
[7] H. Koshima and J. Hoshen, "Personal Locator Services Emerge," In *IEEE Spectrum*, vol. 37, issue 2, pp. 41-48, February 2000.
[8] S. Ahonen and P. Eskelinen, "Mobile Terminal location for UMTS," in *IEEE Aerospace and Electronic Systems Magazine*, vol. 18, issue 2, pp. 23-27, February 2003.
[9] S. Ahonen and P. Eskelinen, "Performance Estimations of Mobile terminal location with database correlation in UMTS networks," in *Proc. Of Int'l Conf. on 3G Mobile Communication Technologies*, pp. 25-27, June, 2003.

[10] M. Triki, D. T. M. Slock, V. Rigal and P. Francois, "Mobile terminal positioning via power delay profile fingerprinting: reproducible validation simulations", *IEEE 64th Vehicular Technology Conference*, pp. 1-5, September 2006.

[11] Y. Jin, W.-S. Soh, W.-C. Wong, "Indoor localization with channel impulse response based fingerprint and nonparametric regression", *IEEE Transactions on Wireless Communications*, vol. 9, no. 3, pp. 1120-1127, March 2010.

[12] W. Q. Malik, B. Allen, "Wireless sensor positioning with UWB fingerprinting", *1st European Conference on Antennas and Propagatoin EuCAP*, pp. 1-5, November 2006.

[13] H. Liu, H. Darabi, P. Banerjee and J. Liu, "Survey of wireless indoor positioning techniques and systems", *IEEE Transactions on Systems, Man and Cybernetics— Part C: Applications and Review*, vol. 37, no. 6, November 2007.

[14] M. Brunato and R. Battiti, "Statistical learning theory for location fingerprinting in wireless LANs," Computer Networks, vol. 47, No. 6, pp. 825-845, April 2005.

[15] T. Roos, P. Myllymaki, H. Tirri, P. Misikangas and J. Sievanen, "A probabilistic approach to WLAN user location estimation," *International Journal of Wireless Information Networks (IJWIN)*, vol. 9, pp. 155-164, July 2002.

[16] A. Kushki, K. N. Plataniotis and A. N. Venetsanopoulos, "Kernel-based positioning in wireless local area networks," *IEEE Mobile Computing*, vol. 6, no. 6 pp. 689-705, June 2007.

[17] D. Fox, J. Hightower, L. Liao, D. Schulz, "Bayesian filtering for location estimation," *IEEE Pervasive Computing*, vol. 2, no. 3 pp. 24-33, 2003.

[18] D. Madigan, E. Einahrawy, R. Martin, W.-H. Ju, P. Krishnan and A. Krishnakumar, "Bayesian indoor positioning systems," in *Proc. INFOCOM*, vol. 2, pp. 1217-1227, 2005.

[19] M. A. Youssef, A. Agrawala, and A. U. Shankar, "WLAN location determination via clustering and probability distribution," in *Proc. IEEE International Conf. on Pervasive Computing and Communications*, pp. 143-150, 2003.

[20] A. Agiwal, P. Khandpur, H. Saran, "LOCATOR: location estimation system for wireless LANs," in *Proc. Of 2nd ACM Int'l workshop on Wireless Mobile Applications and Services On WLAN Hotspots*, pp. 102-109, 2004.

[21] Y. Moustafa and A. Ashok, "The Horus WLAN location determination system," in *Proc of 3rd International Conference on Mobile Systems, Applications and Services*, pp. 205-218, 2005.

[22] R. Battiti, T. L. Nihat, and A. Villani, "Location-aware computing: a neural network model for determining location in wireless LANs," Technical Report DIT-020083, Dept. of Info. and Comm. Technology, University of Trento, Italy, 2002.

[23] A. M. Edgar, C. Raul and F. Jesus, "Estimating user location in a WLAN using back propagation neural networks," *Lecture Notes in Computer Science*, vol. 3315, pp. 737-746, 2004.

[24] Z. Li Wu, C. hung Li, J.-Y. Ng and K. R. Leung, "Location estimation via support vector regression," *IEEE Trans. Mobile Computing*, vol. 6, no. 3, pp. 311-321, 2007.

[25] C. L. Wu, L. C. Fu and F. L. Lian, "WLAN location determination in e-home via support vector classification", in *Proc. IEEE Int'l Conference on Networking, Sensing and Control*, pp. 1026-1031, 2004.

[26] S.-H. Fang, T.-N. Lin, K.-C Lee, "A novel algorithm for multipath fingerprinting in indoor WLAN environments", *IEEE Transactions on Wireless Communications*, vol. 7, no. 9, September 2008.

[27] T.-N. Lin, P.-C. Lin, "Performance comparison of indoor positioning techniques based on location fingerprinting in wireless networks," in *Wireless Networks, Communications and Mobile Computing*, pp. 1569-1574, 2005.

[28] V. Honkavirta, T. Perala, S. A.-Loytty and R. Piche, "A comparative survey of WLAN location fingerprinting methods," *Proc. of the 6th Workshop on Positioning, Navigation and Communication (WPNC'09)*, pp. 243-251, March 2009.

[29] V. Honkavirta, "Location Fingerprinting Methods in Wireless Local Area Networks," MS Thesis, Tampere University of Technology, Finland, October 2008.

[30] F. Evennou and F. Marx, "Advanced integration of WiFi and inertial navigation systems for indoor mobile positioning", *EURASIP Journal on Applied Signal Processing*, Vol. 2006, Article ID 86706, pp. 1-11, January 2006.

[31] C. E. Shannon, "A mathematical theory of communication," *Bell Syst. Tech. J.*, vol. 27, pp. 379-423; 623-656, July/October 1948 [Online] Available http://cm.bell-labs.com/cm/ms/what/shannonday/paper.html.

[32] J.-F. Bercher, C. Vigant, "Estimating the entropy of a signal with applications", *IEEE Trans. on Signal Processing*, vol. 48, no. 6, pp. 1687-1694, June 2000.

[33] R. Moddemeijer, "On estimation of entropy and mutual information of continuous distributions," *Signal Processing*, vol. 16, no. 3, pp. 233-246, 1989.

[34] P. Hall and S. Morton, "On the estimation of entropy," *Ann. Inst. Stat. Math.*, vol. 45, pp. 69-88, 1993.

[35] O. Vasicek, "A test of normality based on sample entropy," *J. R. Stat. Soc. Ser. B*, vol. 38, pp. 54-59, 1976.

[36] J. C. Correa, "A new estimator of entropy," *Commun. Stat.—Theory Methodol.*, vol. 24, pp. 2439-2449, 1995.

[37] P. Viola, N. N. Schraudolph and T. J. Sejnowski, "Empirical entropy manipulation for real-world problems," in *Advances in Neural Information Processing Systems* 8. Cambridge, Mass.: MIT Press, 1996.

[38] D. T. Pham, "Blind separation of instantaneous mixture of sources via an independent component analysis," *IEEE Trans. Signal Processing*, vol. 44, pp. 2768-2779, November 1996.

[39] S. Kay, "Model-based probability density function estimation," *IEEE Signal Processing Letters*, vol. 5, no. 12, December 1998.

[40] M. H. Hayes, Statistical Digital Signal Processing and Modeling, John Wiley & Sons, Inc., 1996.

[41] G. Kitagawa and W. Gersh, "A smoothness priors long AR model method for spectral estimation," *IEEE Trans. Automat. Contrl.*, vol. AC-30, pp. 57-65, 1985.

[42] J.-F. Giovannelli, G. Demoment and A. Herment, "A Bayesian method for long AR spectra estimation: A Comparative study," *IEEE Trans. Ultrason. Freq. Ferroelect.*, vol. 43, pp. 220-233, March 1996.

[43] B. Yang, K. B. Letaief, R. S. Cheng and Z. Cao, "Channel estimation for OFDM transmission in multipath fading channels based on parametric channel modeling," *IEEE Trans. on Commun.*, vol. 49, no. 3, March 2001.

[44] K. Kaemarungsi and P. Krishnamurthy, "Modeling of indoor positioning systems based on location fingerprinting," *Proc. INFOCOM*, vol. 2, pp. 1012-1022, 2004.

All references referred to above are hereby incorporated by reference.

The invention claimed is:

1. A method of locating a wireless communications device, the method including the steps of:

obtaining measurements of the entropy of a characteristic of the wireless communications channel or estimates of entropy of a characteristic of the wireless communications channel for a plurality of known locations;

storing the measurements or estimates in association with the respective locations as said plurality of previously obtained measurements or estimates;

calculating an estimate of the entropy of a characteristic of a wireless communications channel between the wireless device and an access point for said wireless device;

comparing said estimate of entropy against the plurality of previously obtained measurements of the entropy of said characteristic for known locations or previously obtained estimates of the entropy of said characteristic for known locations; and determining a location of said wireless device based on said comparison.

2. The method according to claim 1 wherein the characteristic of the wireless communications channel is the channel transfer function.

3. The method according to claim 1 further including the step of estimating said characteristic of the wireless communication channel prior to estimating its entropy.

4. The method according to claim 1 wherein the step of calculating said estimate calculates a time-averaged estimate of said entropy.

5. The method according to claim 1 wherein the step of determining selects the known location for which the previously obtained measurements or estimates of the entropy are closest to the calculated entropy estimate for the wireless device.

6. The method according to claim 5 wherein said steps of comparing and determining use a k-nearest neighbour approach.

7. The method according to claim 1 wherein the wireless device is in an indoor location.

8. The method according to claim 1 wherein the characteristic of the wireless communications channel is one of a channel transfer function, a channel impulse response, and a frequency channel coherence function.

9. A method of locating a wireless device, the method including the steps of:

obtaining measurements of the entropy of a characteristic of the wireless communications channel or estimates of entropy of a characteristic of the wireless communications channel for a plurality of known locations;

storing the measurements or estimates in association with the respective locations as said plurality of previously obtained measurements or estimates;

calculating a plurality of estimates of the entropy of a characteristic of each of a plurality of wireless communications channels, each of said wireless communication channels being a channel between the wireless device and an access point for said wireless device for a known location; and comparing said estimates of entropy against the plurality of previously obtained measurements of the entropy of said characteristic or previously obtained estimates of the entropy of said characteristic; and determining the location of said wireless device based on said comparisons.

10. A system for determining a location of a wireless communication device, the system including:

at least one access point arranged to communicate with said wireless device over a wireless communication channel;

a memory storing a plurality of associations between known locations and previously obtained measurements of the entropy of a characteristic of said wireless communication channel or previously obtained estimates of the entropy of a characteristic of said wireless communication channel, the plurality of stored associations created by:

obtaining measurements of the entropy of said characteristic of the wireless communications channel or estimates of the entropy of said characteristic of the wireless communications channel for said plurality of known locations;

storing the measurements or estimates in association with the respective locations as said plurality of previously obtained measurements or estimates; and a control unit arranged to calculate an estimate of the entropy of said characteristic of said wireless communication channel and to determine a location of the wireless device based on a comparison between said estimate and the contents of said memory.

11. The system according to claim 10 wherein the characteristic of the wireless communications channel is the channel transfer function.

12. The system according to claim 10 wherein the control unit is further arranged to estimate said characteristic of the wireless communication channel prior to estimating its entropy.

13. The system according to claim 10 wherein the control unit determines the known location for which the previously obtained measurements or estimates of the entropy are closest to the calculated entropy estimate as the location of the wireless device.

14. The system according to claim 10 wherein the access point is in an indoor location.

15. The system according to claim 10 wherein the control unit sends the determined location of the wireless communications device to said device through said access point.

16. The system according to claim 10 wherein there are a plurality of access points each arranged to communicate with said wireless device over a wireless communications channel and the control unit is arranged to calculate an estimate of the entropy of a characteristic of each wireless communication channel and to determine a location of the wireless device based on said estimates.

17. The system according to claim 10, further including at least one wireless communication device.

18. A wireless communication device arranged to communicate with at least one access point over a wireless communication channel, the wireless device having:

a communication unit for communicating with said access point; and a control unit for estimating or calculating a characteristic of said wireless communication channel, wherein the control unit communicates with a central control unit through said communication unit and said access point to determine a location of the wireless communication device based on an estimate of the entropy of said characteristic compared to stored associations between a plurality of known locations and previously obtained measurements of the entropy of said characteristic or previously obtained estimates of the entropy of said characteristic, the stored associations created by:

obtaining measurements of the entropy of said characteristic of the wireless communications channel or estimates of the entropy of said characteristic of the wireless communications channel for said plurality of known locations;

storing the measurements or estimates in association with the respective locations as said plurality of previously obtained measurements or estimates.

19. The wireless communication device according to claim 18 wherein the control unit further estimates the entropy of said characteristic and sends said entropy estimate to said central control unit and receives a determination of the location of the wireless communication device from the central control unit.

20. The wireless communication device according to claim 18 wherein the control unit sends said estimated or calculated characteristic to said central control unit and receives a determination of the location of the wireless communication device from the central control unit.

21. The wireless communication device according to claim 18 further comprising a display, wherein the control unit is arranged to display said determined location on said display.

* * * * *